United States Patent
Fainstain (10) Patent No.: US 8,619,182 B2
(45) Date of Patent: Dec. 31, 2013

(54) FAST AUTO FOCUS TECHNIQUES FOR DIGITAL CAMERAS

(75) Inventor: Evgene Fainstain, San Jose, CA (US)

(73) Assignee: CSR Technology Inc., San Jose, CA (US)

( * ) Notice: Subject to any disclaimer, the term of this patent is extended or adjusted under 35 U.S.C. 154(b) by 0 days.

(21) Appl. No.: 13/413,584

(22) Filed: Mar. 6, 2012

(65) Prior Publication Data

US 2013/0235250 A1    Sep. 12, 2013

(51) Int. Cl.
*H04N 5/232* (2006.01)
*H04N 5/225* (2006.01)

(52) U.S. Cl.
USPC ........................... 348/349; 348/360; 348/335

(58) Field of Classification Search
USPC ............ 348/326, 345–357, 745, 806, E9.021, 348/E5.45, 224.1, 343, 360, 335, 268, 368; 359/736, 731, 759, 793
See application file for complete search history.

(56) References Cited

U.S. PATENT DOCUMENTS

| | | | |
|---|---|---|---|
| 7,916,207 B2 | 3/2011 | Moon et al. | |
| 2003/0169347 A1* | 9/2003 | Jenkins | 348/222.1 |
| 2004/0165090 A1 | 8/2004 | Ning | |
| 2004/0165156 A1* | 8/2004 | Akiyama | 353/84 |
| 2005/0147403 A1 | 7/2005 | Ohmura | |
| 2006/0092314 A1 | 5/2006 | Silverstein et al. | |
| 2008/0002959 A1* | 1/2008 | Border et al. | 396/111 |
| 2011/0018993 A1 | 1/2011 | Wang et al. | |
| 2011/0038028 A1* | 2/2011 | Dharmatilleke | 359/290 |
| 2012/0113227 A1* | 5/2012 | Paik et al. | 348/46 |
| 2012/0189195 A1* | 7/2012 | Paik et al. | 382/164 |
| 2013/0162849 A1 | 6/2013 | Wu et al. | |

FOREIGN PATENT DOCUMENTS

| | | |
|---|---|---|
| JP | 2001103358 A | 4/2001 |
| JP | 2001174696 | 6/2001 |

OTHER PUBLICATIONS

Search Report for British Patent Application No. GB1303510.0 mailed Aug. 7, 2013.

* cited by examiner

*Primary Examiner* — Tuan Ho
*Assistant Examiner* — Chan Nguyen
(74) *Attorney, Agent, or Firm* — Frommer Lawrence & Haug LLP; John W. Branch (57) ABSTRACT

Embodiments are directed towards using a color filtration system to generate multiple color images of a same single image that is displayed on a photo sensor plane to determine a lens adjustment position for a defined region of interest usable to automatically focus at least the defined region of interest using the single image. In one embodiment, the color filtration system employs a multiple color aperture filter and two single element lenses to generate multiple color images when an object within the single image is out of focus. In another embodiment, a metal dielectric interference filter is mounted directly in front of the photo sensor, to generate the multiple color images.

10 Claims, 8 Drawing Sheets

FAST AUTO FOCUS TECHNIQUES FOR DIGITAL CAMERAS

TECHNICAL FIELD

The present embodiments relate generally to autofocus of a digital camera or other imaging device and, more particularly, but not exclusively, to using a color filtration system to generate multiple color images of a same single image that is displayed on a photo sensor plane to determine altos adjustment position for a defined region of interest usable to automatically focus at least the defined region of interest using the single image.

BACKGROUND

Many of today's digital camera manufacturers seek to provide cameras that operate in virtually a point and shoot approach, where the user might need to merely point the lens of a camera towards an image, and expect that the camera does "all the rest." One of those actions often included in "all the rest," is "autofocus." Autofocus systems are often arranged to automatically focus the image of a scene onto photo sensors within the camera. Many of the autofocus systems, however, require a significant amount of time to accomplish the autofocus task, sometimes known as shutter lag time. Other systems attempt to minimize this shutter lag time by employing costly additional optical components that may obstruct a camera's optical path during the autofocus operation. This obstruction may result in disallowing 'live previews' and image capture of a scene during the autofocus operation. Proposed solutions to these problems may further require the development and use of special lens designs that are costly, or otherwise not practical to implement in many of today's cameras. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present embodiments, reference will be made to the following Detailed Description, which is to be read in association with the accompanying drawings, in which.

DETAILED DESCRIPTION

The present embodiments now will be described more fully hereinafter with reference to the accompanying drawings, which form a part hereof, and which show, by way of illustration, specific aspects in which the embodiments may be practiced. These embodiments may, however, take many different forms and should not be construed as limited to the embodiments set forth herein; rather, these embodiments are provided so that this disclosure will be thorough and complete, and will fully convey the scope to those skilled in the art. Among other things, the present embodiments may include methods or devices. Accordingly, the present embodiments may take the form of entirely hardware or a combination of software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "image," or "image data," refers to data that defines an image to be displayed in at least two dimensions, and may take the form of a single display of the image, or a time varying display of a sequence of images comprising multiple video frames which may be spaced in time. For example, such image may be a signal that might be a moving scene derived from a video camera, or other photo-sensing and recording mechanism.

Automatic focusing of a camera, or other imaging device, may be considered to employ either an "active" focusing mechanism or a "passive" focusing mechanism. In active focusing mechanism, a form of signal, such as sound navigation ranging (SONAR), infrared, or the like is used to bounce a signal off the subject within an image. An intensity of the reflected signal is then used to judge a distance between the imaging device and the subject. Such mechanisms are known as active because the autofocus system is virtually always sending out the signal when in focus mode. Active focusing systems however, require that the emitter of the signal and the receiving sensors have a clear path to and from the subject. Moreover, bright objects can make it difficult for such systems to 'see' the reflected signal.

In many passive automatic focusing systems multiple images of the scene are captured and analyzed to determine a distance between objects in the scene and the camera's lens. Ambient lighting may sometimes be used when it is determined that there is insufficient light to perform the passive autofocus analysis on the captured images. This passive auto focus "assist illumination" can be obtained from an infrared light source, for example. However, because multiple images are used in these systems, camera jitter may significantly affect the auto focusing outcome.

Passive automatic focusing systems may be categorized into contrast detection types or phase detection types. In contrast detection types, contrast detection may be achieved by measuring a contrast within a photo sensor's field through a lens. An intensity difference between adjacent pixels on the sensor increases when the image impinging on the sensor is in what is determined to be a correct image focus. The lens may be adjusted until a maximum contrast is detected. When using contrast detection systems, there might be no data available indicating whether a subject of interest is in front focus or back focus—that is, focused in front of the photo sensor's optical plane or in back of the photo sensor's optical plane. This often makes it necessary to move the lens around the point where maximum contrast may be detected in order to find an optimum lens focus position. This is sometimes accomplished by mechanically sweeping the camera's lens from its infinity position to its closest focus position once, and then "hunting" the lens position around the point of maximum detected contrast before an optimum focus indication is provided. The need to mechanically scan the lens over a focus range limits the speed in which a contrast detection auto focus system's operation can be performed, and may disallow the auto focus operation from being performed quickly.

In phase detection passive auto focusing, an optical image separator may be incorporated into a digital single-lens reflex (DSLR) camera's lens' optical path when its reflex mirror is in the aiming and focusing position, as opposed to a picture capturing position. In this position, the light path from lens to sensor is intercepted by a reflex mirror, which reflects light to a focusing screen and from there to a viewfinder. However, to implement a phase detection auto focusing system, often many additional optical components are needed. This may add significant costs to a digital camera. Further during auto focus operations, these optical components may need to be deployed in the optical path of the camera. In DSLRs, this may mean that at the time of focus, a reflex mirror intercepts the light path between the lens and the photo sensor. This then may disallow a "live preview image" of the scene from appearing on the digital camera's liquid crystal display (LCD) and prevent image capture. In mirrorless interchangeable-lens camera (MILCs), a lower cost, high quality digital camera configuration characterized by large sensors, no mirror, and interchangeable lenses, the phase detection auto focusing system may not be useable. Thus there remains a need for an auto focusing apparatus and methods that can rapidly effect auto focus operation, be used without added, expensive, optical components, and does not obstruct a camera's optical path during auto focus operation.

The following briefly describes the embodiments in order to provide a basic understanding of some aspects. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards using a color filtration system to generate multiple color images of a same single image that is displayed on a photo sensor plane to determine a lens adjustment position for a defined region of interest usable to automatically focus at least the defined region of interest of the single image.

In a first configuration, a multiple color aperture filter and two single element lenses are placed in a body of a digital camera, or other device, behind a standard digital lens. These components, as described further below, are mounted immediately in front of the camera's photo sensor, with the multiple colored aperture filters being situated between the two lenses. These components are placed as close to the camera's photo sensor as physically possible, in order to minimize an open distance in front of the photo sensor needed to accommodate them. This arrangement is directed to provide the functionality of the multiple colored aperture auto focusing approach, while allowing the use of standard camera lenses and low cost additional components.

In a second configuration, a metal dielectric interference filter is mounted within the device, directly in front of its photo sensor, as close as physically possible to the camera's sensor This type of filter uses a light interference effect to transmit or reflect desired wavelength regions, and thus provides a transmission band with angular dependence. When mounted in front of the device's photo sensor at a predetermined angle, this transmission band angular dependence will cause color images of objects projected onto the photo sensor by the device's lens, to be displaced as a function of the distance the lens is away from an object's focus. When the desired object is in focus, all color images will be coincident for that object and no color fringes will appear around the object. Thus, this second configuration, as with the first configuration, is directed towards providing the functionality of multiple colored aperture auto focusing, while enabling use of standard camera lenses.

In one embodiment, the interference filter may be physically removed from the optical path when image capture is performed. However, in another embodiment, the interference (or otherwise light direction-versus-spectrum separating) filter may be effectively removed by changing its optical properties by applying, for example, a voltage or physical pressure or vibrations to the filter, and thereby resulting in the filter to losing its interferometric properties and therein become transparent (or otherwise "more transparent", or "less selective/separating," such as to alleviate the task of the following digital image processing correction, if any).

It should be noted, however, the second configuration is not constrained to a metal dielectric interference filter. For example, in another embodiment, a volume based holographic filter may be used to create interference patterns, and thereby cause color images of objects to separate when the objects are not in focus.

Illustrative Operating Environments

Figure 1:
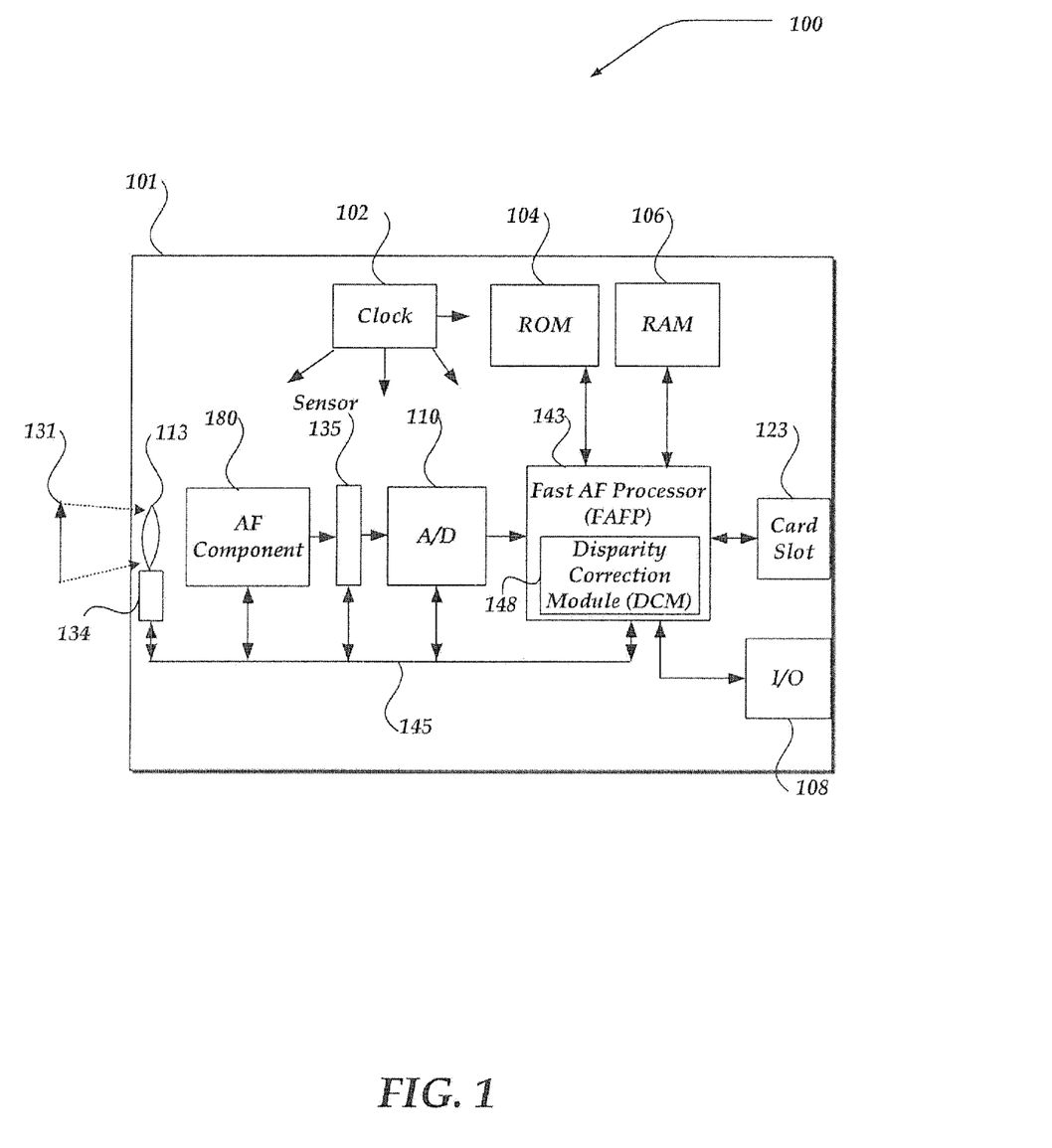
FIG. 1 illustrates a system diagram of one embodiment of an environment in which the embodiments may be practiced.

FIG. 1 shows components of an environment in which embodiments may be practiced. Not all the components may be required to practice the embodiments, and variations in the arrangement and type of the components may be made without departing from the spirit or scope of the invention. Moreover, various implementations of the system may include many more or less components than those shown in FIG. 1. However, the components shown are sufficient to disclose an illustrative embodiment.

As shown, system 100 of FIG. 1 may represent a camera or any of a variety of other possible portable devices, including video cameras, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like, that may be configurable to receive and process images. Case 101 therefore is intended to represent any of a variety of such devices, and is not constrained to a particular device or configuration. Thus, system 100 represents any device, article of manufacture, apparatus, or other device directed towards enabling auto focusing as disclosed further herein.

As shown, case 101 of system 100 may include components on a single integrated circuit chip or on a plurality of different circuit chips. In any event, components shown in FIG. 1 include a clock circuit 102 for providing clocking signals to the circuit chips and other components. While illustrated as a separate component, it should be understood that clock circuit 102 may also be included on Fast Auto Focus Processor (FASP) 143, or the like.

Also shown is a volatile non-transitory random-access memory (RAM) circuit chip 106 that may be coupled to FASP 143 to provide temporary data storage. In one embodiment, RAM 106 may be configured to receive and store image data, such as one or more frames of image data for use by FASP 143 or output data from FASP 143. A separate non-volatile non-transitory read-only memory (ROM) memory chip 104 is also coupled to FASP 143 and may be employed for storage of a processor program, calibration data including disparity lens correction data, look-up tables (LUTS), linear and/or non-linear functions, processor readable instructions, a variety of other data useable by system 100, or the like. In one embodiment, ROM 104 may be flash memory, which is re-programmable, or a memory that is programmable once, such as programmable read-only memory (PROM), electrically programmable read-only memory (EEPROM), or any of a variety of other storage devices.

Although not illustrated, other type of memory or physical storage devices may be included within system 100, including, for example, memory cards that may, include semi-conductor flash electrically erasable and programmable read-only memory, removable rotating magnetic disk storage, removable universal serial bus (USB) devices, or any of a variety of other storage devices. In one embodiment, card slot 123 represents any of a variety of physical devices useable to receive various removable memory devices, such as a non-volatile memory card that may be removably inserted into card slot 123. In one embodiment, system 100 may also be configured through Input/Output (I/O) device 108 to access a variety of other storage devices that may be external to system 100. Thus, it should be understood that FASP 143 may be configured to receive one or more images, operate upon the received one or more images, and store, or otherwise send a resulting encoded bit-stream of data using a variety of storage devices, and/or communication mechanisms, and therefore is not limited to merely those described herein.

I/O device 108 includes circuitry for coupling system 100 to one or more external devices, networks or the like, and is constructed for use with one or more communication protocols and technologies, including any of a variety of communication protocols and technologies useable for communicating images, including video images to and/or from system 100. In one embodiment, I/O device 108 is sometimes known as a transceiver, transceiving device, or network interface card (NIC).

I/O device 108 may also provide for various other communications, including for use various input devices, such as keypads, touch screens, or the like, as well as output devices including screen displays, audio outputs, or the like. Thus, although not shown, system 100 may also include a speaker and/or microphone that may be coupled to I/O device 108 to enable communications. System 100 may also include a display that may include a liquid crystal display (LCD), gas plasma, light emitting diode (LED), or any other type of display usable for providing text and/or an image for display. Further, in one embodiment, the display may also include a touch sensitive screen arranged to receive input from an object such as a stylus or a digit from a human hand.

Optical lens system 113 can represent a single lens, as shown, or a plurality of lenses. In one embodiment, a scene 131 is formed in visible optical radiation through an aperture and shutter (which, in one embodiment, may further comprise optical lens system 113) through Auto Focus Component (AFC) 180, which is described below in more detail. An image of scene 131 may then be formed on sensor 135. In one embodiment sensor 135 may be a photo sensor; however, in other embodiments, sensor 135 may be constructed of virtually any light sensing material.

Analog-to-digital converter (A/D) 110 may be configured to receive an analog signal representing an image from sensor 135, and to convert the received signal into digital image that, in one embodiment, may be individual blocks of digital image data representing an intensity of light that may be received through various photo-detectors of image sensor 135 as the image passes through AFC 180. A/D 110 may then provide the digital data to FASP 143, which may then, among other things, be useable to perform a single image fast auto focus determination, as described further below. FASP 143 may employ disparity correction module (DCM) 148 to obtain lens repositioning data. FASP 143 may then send various auto focus control signals through control/data lines 145 to motive element 134 to automatically relocate optical lens component 113 to automatically refocus the image. Control signals sent to optical lens component 113 from FASP 143 may also set a size of an opening of an aperture, as well as operate the shutter, and/or perform other actions. For instance, in one embodiment, as disclosed below, the control signals may also instruct at least some elements within AF component 180 to be moved or otherwise adjusted.

Sensor 135 typically includes a plurality of individual photo-detectors arranged in a two-dimensional array of rows and columns to detect individual pixels of the image. However, other configurations of sensor 135 are also envisaged, and thus, implementations are not constrained to a particular configuration of sensor 135. In any event, signals proportional to an intensity of light striking the individual photo-detectors are obtained in an output signal from sensor 135 and are sent to A/D 110.

Auto Focusing Component Configurations

As discussed above, auto focus component (AF) 180 of FIG. 1 may employ in one embodiment, color filtration optical elements to create displaced multiple color images at the plane of a digital camera's photo sensor, the camera's imaging plane. These images may be physically offset when an object or region of interest (ROI) projected on the imaging plane is out of focus, and physically coincident when the object or ROI is in-focus.

Figure 2:
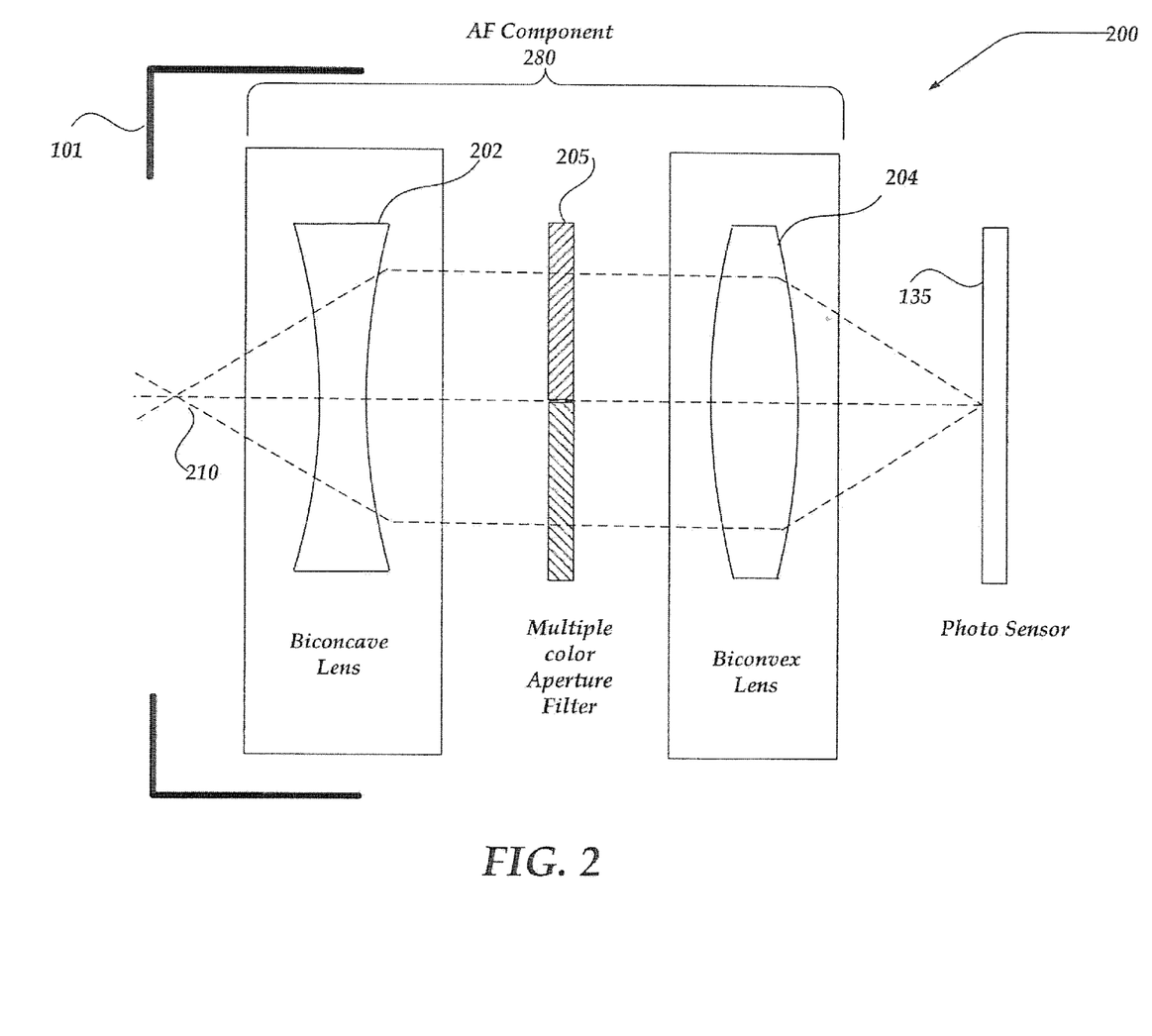
FIG. 2 shows a first embodiment of a multi-colored filter and lens configuration useable within a system such as shown in FIG. 1 useable to for a single image fast autofocus.

FIG. 2 shows a first embodiment of a multi-colored filter and lens configuration useable within a system such as shown in FIG. 1 useable to for a single image fast autofocus. In one embodiment, system 200 of FIG. 2 may include more or less components than illustrated. However, those illustrated are sufficient to disclose a first illustrative embodiment.

System 200 illustrates sensor 135, and device 101 of FIG. 1. FIG. 2 further illustrates Auto Focus (AF) component 280 as a first configuration of AF component 180 of FIG. 1. In this configuration, AF 280 includes a multiple color aperture filter 205, comprising a plurality of color filters placed at multiple radial positions around its center axis, and two lenses, 202 and 204, placed in the body of the case 101, behind the digital camera's standard lens (not shown, lens 113 of FIG. 1).

Figure 3:
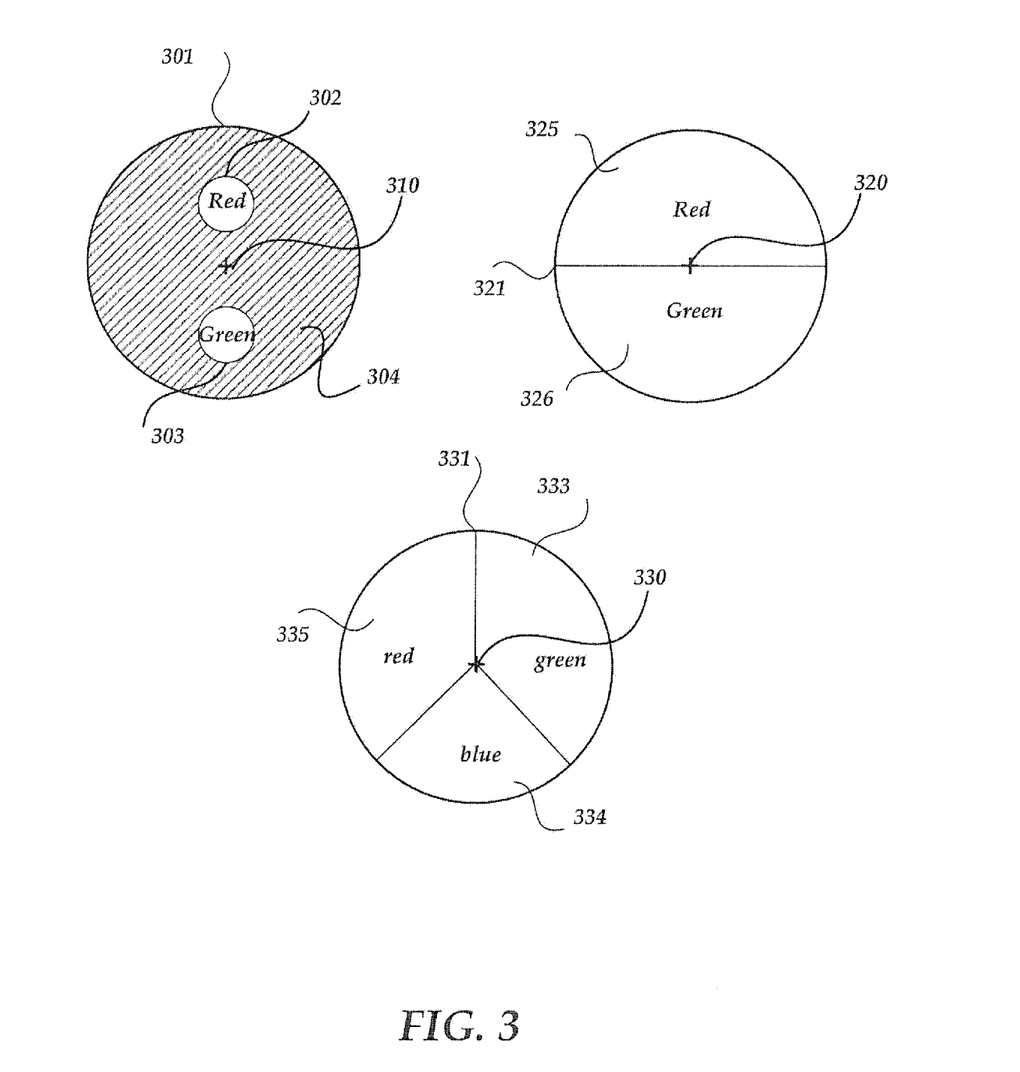
FIG. 3 illustrates various embodiments of multi-colored filters useable in which light travels according to various embodiments.

Briefly referring to FIG. 3, FIG. 3 illustrates various embodiments of multi-colored filters useable in at least the first configuration of FIG. 2. In one embodiment, a multiple colored aperture filter 301 is configured as a circular light occluding plate, with a first circular aperture 302 on a first position of the circular plate's central axis 310 covered with a first color filter material, and a second circular aperture 303 covered with a second color filter material, and an opaque central axis area 304. Multiple colored aperture 301 may be mounted such that its central axis 310 is coincident with the optical axis of the lens, allowing light to pass through each of the off axis color filters 302-303 and block light from passing through the lens' optical axis 304.

In another embodiment, multiple colored aperture filter 321 is configured to illustrate where the filter is divided into a first and second region 325-326, each region having a different color filter material. In still another embodiment, multiple colored aperture filter 331 illustrates that possible embodiments are not constrained to merely two colored filters, and shows that in this embodiment, three colored filter regions 333-335 may be employed. It should be recognized that embodiments are not constrained to these three illustrative configurations, and others are also envisaged. Thus, these employed are to be viewed as merely non-limiting, non-exhaustive examples of possible multiple colored aperture filters useable in at least FIG. 2.

In any event, as shown in FIG. 3, the multiple colored aperture filters illustrate that the color filters may be of differing colors, such as red or magenta/green, or red (or yellow, cyan, magenta)/green/blue, et cetera. However, it should be recognized that other arrangements may also be used to filter colors from a light source.

Returning to FIG. 2, the multiple colored aperture filters of FIG. 3 may represent various embodiments of filter 205 that is placed between two lenses 202 and 204. As illustrated, one of lenses 202 and 204 is configured as an inverse or otherwise complementary of the other lens For example, as shown, lens 202 is configured as a biconcave lens, while lens 204 is configured as a biconvex lens.

These optical components of AF component 280 are mounted immediately in front of, and as close to photo sensor 135's plane as possible. The inverse second lens (lens 204) is configured to negate effects of first lens 202 and thereby allows color images to be projected onto photo sensor 135 as if the multiple color aperture filter is located at an internal aperture stop plane of the camera's lens 113 of FIG. 1.

While any multiple colored aperture may selected, as discussed above, for purposes of illustration, the two colored aperture filter 301 of FIG. 3 may be selected. The red/magenta filter 302 may be placed on one side of the lens' optical axis and the second filter (green as shown) 303 may be placed on the opposite side to the lens' optical axis. The multiple colored aperture filter can be inserted in the lens' optical path during at least the image focusing operation, and optionally, removed from the optical path during final image acquisition, in order to avoid coloration artifacts from appearing in a final captured image. However, as discussed further, this is not a requirement.

At a lens position that an object or ROI 210 to be acquired is not in focus the green and magenta images are displaced on photo sensor 135's plane. At a lens position that the object or ROI 210 to be acquired is in focus, the green and magenta images are coincident on photo sensor 135's plane.

Figure 4:
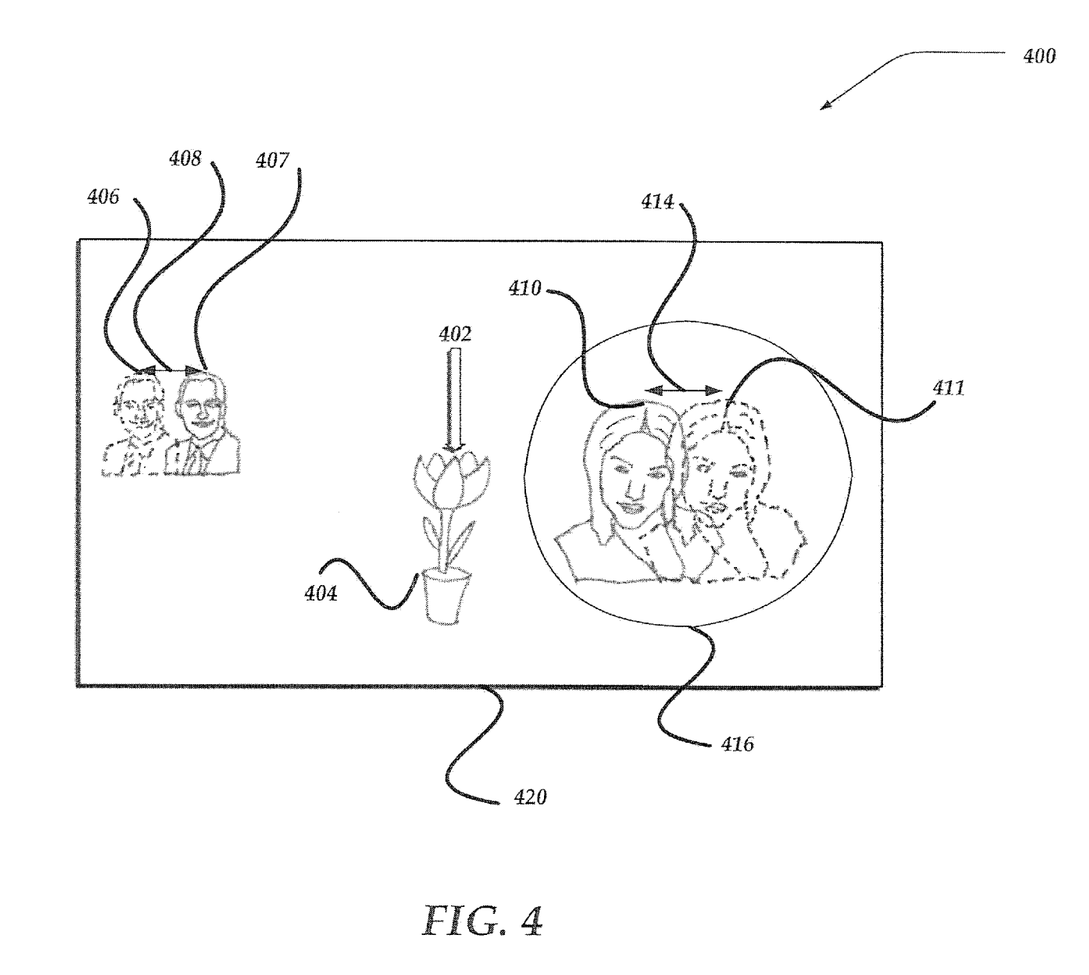
FIG. 4 illustrates one non-exhaustive non-limiting example of a scene within an image having multiple objects.

Referring briefly to FIG. 4, shown is a non-exhaustive non-limiting example of a scene having multiple images 406-407, 404, and 410-411. For purposes of illustration only, images 406-407, 404, and 410-411 represent objects are different distance from the camera's lens. As shown, each of the images 406-407 and 410-411 show two adjacent and/or overlapping color images. For example objects 406-407 illustrate two images, image 406 as dashed to represent a green filter image of an object, and image 407 representing a red/magenta filter image of the object. Similarly, the object of images 410-411 show image 411 as a green filter image of that object, and 410 image as a red/magenta filter image of that object. The illustration of multiple disparate images indicates that these objects are out of focus on the photo sensor 135. However, image 404 indicated by arrow 402 shows a single image for the object indicating that its multiple colored images are coalesced, and therefore, the image 404 of that object is in focus on photo sensor 135.

In addition, shown in FIG. 4 is one example of a ROI 416. As shown, ROI 416 currently envelops the disparate images 410-411. However, ROI 416 could also be located over any of the other shown images, or the like. In one embodiment ROI 416 may represent a region within a scene for which a user of the device selects to be within focus. Such region may be selected using any of a variety of mechanisms, currently beyond the scope of this disclosure. Moreover, while ROI 416 is shown as a circular region, the ROI may also be of virtually any other shape, or size. Moreover, in one embodiment, the ROI might be a fixed location within a lens' viewing scope. For example, the ROI might be fixed as a region in a central portion of the lens' viewing scope. In another embodiment, the ROI might be automatically selected by operations within the camera based on various criteria, such as selecting a facial image or images, selecting a closest image, or the like.

Figure 7:
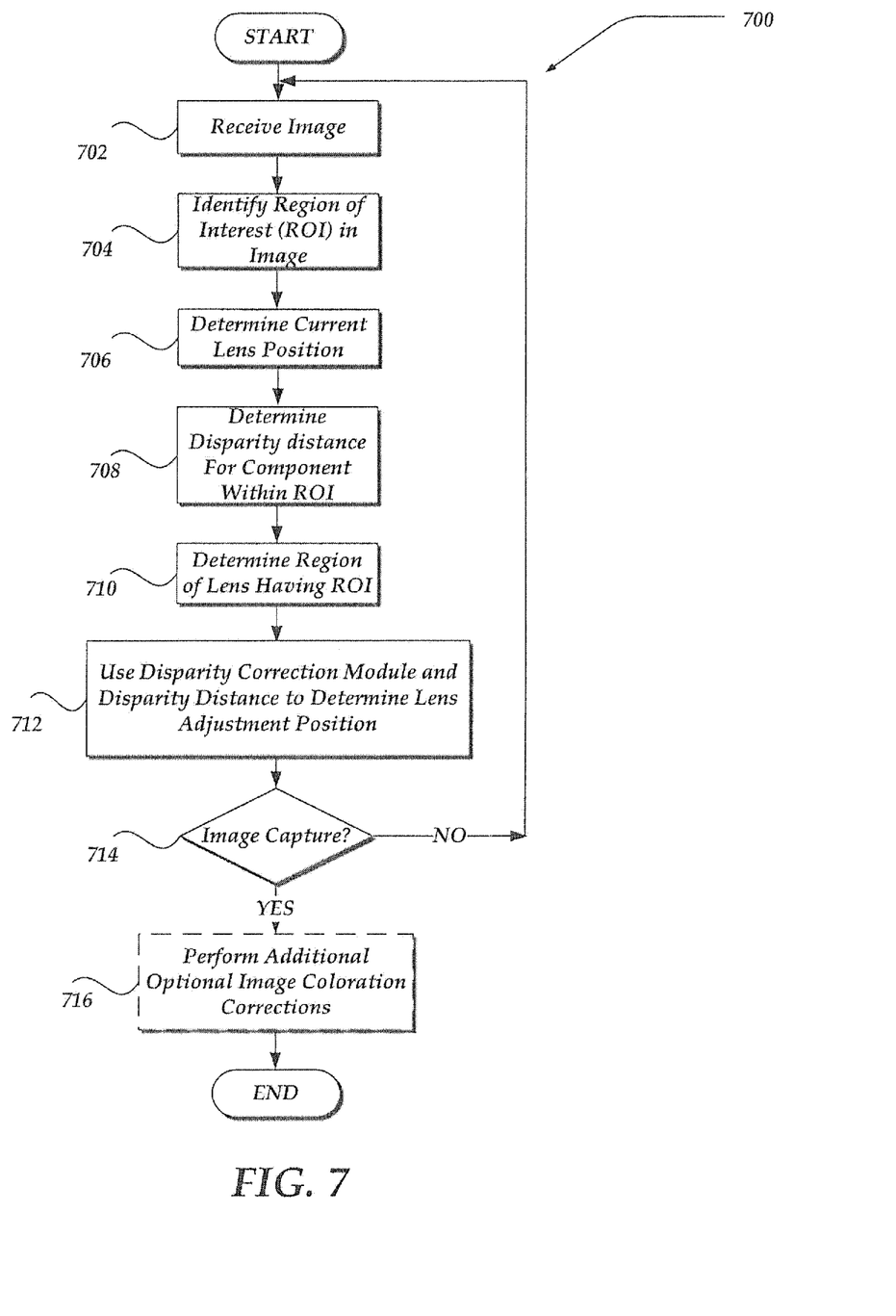
FIG. 7 illustrates one embodiment of a flowchart using disparities between multi-colored images to generate lens adjustment positions useable in performing fast autofocus from a single image.

A point of maximum coincidence between the different colored images for the same object, as measured from a defined starting reference image offset position, is known as the image disparity. For images 406-407, this displacement distance is disparity 408, while this distance is disparity 414 for images 410-411. In one embodiment, this disparity (408 or 414) may be employed as input to the disparity correction module (DCM) 148 of FIG. 1, DCM 148 may then determine and provide as an output control signal, a lens adjustment position useable to re-locate the camera lens and cause a selected object at a given distance in front of the lens to be in focus on photo sensor 135. In one embodiment, DCM 148 may employ a look-up table (LUT) to obtain the lens adjustment position. In one embodiment, the LUT may be populated with data by use of a calibration process that equates lens positions with a metric or index response to the multi color image's being coincident. However, it is noted that other implementations may also be employed. For example, rather than a LUT, a non-linear function may be employed, as well as any of a variety of other mechanisms. In one embodiment, the LUT or other DCM employed mechanism may be obtained during calibration during manufacturing. However, in still another embodiment, calibration and/or re-calibration may be performed through actions within the camera, after manufacturing, sell, or the like, perhaps by a consumer. In any event, one possible calibration process is described in more detail below in conjunction with FIG. 8. FIG. 7, described in more detail below, illustrates one embodiment, of a process using results of FIG. 8 to fast auto focus from a single image.

Figure 5:
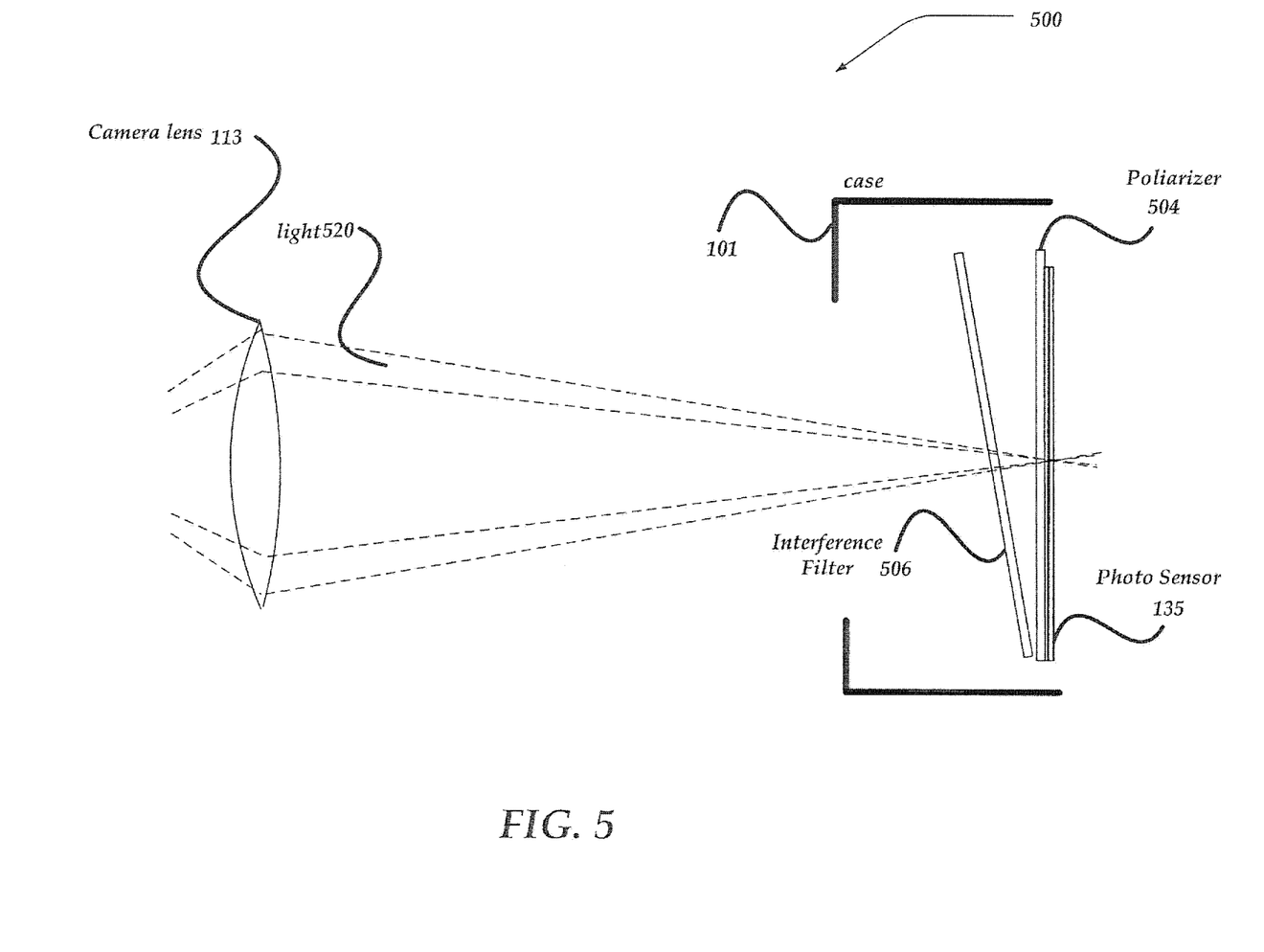
FIG. 5 illustrates a second embodiment of an interference filter and lens configuration useable within a system such as shown in FIG. 1 useable to for a single image fast autofocus.

FIG. 5 illustrates a second embodiment of an interference filter and lens configuration useable within a system such as shown in FIG. 1 useable to for a single image fast autofocus. System 500 of FIG. 5 may include more or less components than illustrated. However, those illustrated are sufficient to disclose a second illustrative embodiment.

Shown in FIG. 5 is an interference filter 506 is mounted within case 101 directly in front of photo sensor 135, and as close as possible to the sensor's focal plane. In one embodiment, interference filter 506 is mounted in a fixed position relative to the photo sensor 135, and is arranged not to be subsequently modified as part of the auto-focusing process. Although, in another embodiment, during final image capture, interference filter 506 may be removed from between the focusing lens 113, and photo sensor 135.

In one embodiment, interference filter 506 may be a metal dielectric interference filter (MIF), however, other materials, may also be employed. In any event, interference filter 506 is configured to use light interference to pass or block desired wavelength regions. An S type MIF filter is one type of interference filter that can be used. This type of filter is configured to use a triple-layer structure consisting of two partially transmitting, partially reflecting, metal layers, separated by a transparent dielectric layer. The metal layers may be deposited on a glass, quartz, or similar substrate. For incident light that is perpendicular to the filter's surface, an optical path's length between the two metal layers is half of the transmitted wavelength, or an integer multiple of half of the transmitted wavelength. Therefore, other wavelengths are almost entirely blocked from passing through the filter.

When interference filter 506 is tilted with respect to an angle of an incident light, such as light 520, its transmission band shifts toward shorter wavelengths. If mounted at an angle directly in front of photo sensor 135, this transmission band angular dependence will cause color images of objects projected on photo sensor 135's plane by lens 113, to be displaced as a function of the distance the lens 113 is away from object focus. When the desired object is in focus, all color images will be coincident and thus there will be no color fringes. Otherwise, the color images will be separated by some measurable disparity. These techniques are employed in the second configuration of FIG. 5 to position the lens 113 so that the image of a desired scene object is in focus on the photo sensor 135's plane. Unlike the first configuration of FIG. 2, which by use of a multiple colored aperture filter causes images with discrete colors to be projected onto photo sensor 135, interference filter 506 causes images with a continuous range of colors to be projected onto photo sensor 135. In order to use these continuous color images, RGB color signals from photo sensor 135 may be mixed to form two or more "cardinal color images," where each cardinal color image has a predetermined colorimetry. These cardinal color images may then be used instead of the magenta/green or red/green/blue image examples of the first configuration to measure disparity and perform fast single image auto focusing.

Figure 6A:
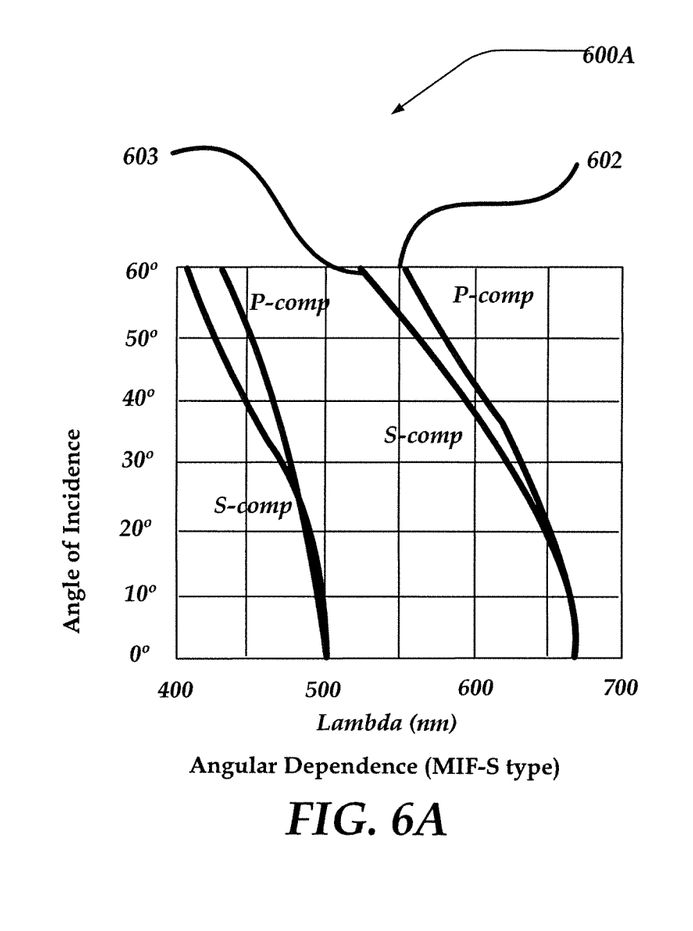
FIG. 6A illustrates non-exhaustive non-limiting examples of angular dependence characteristics for an interference filters usable in the configuration of FIG. 5.
Figure 6B:
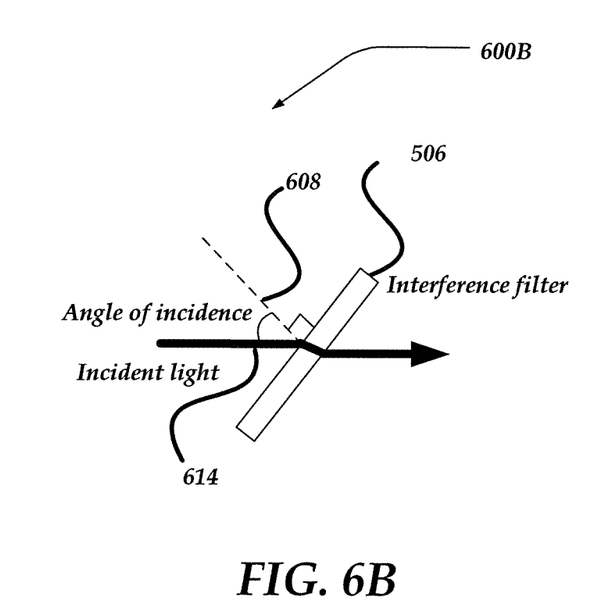
FIG. 6B illustrates non-exhaustive non-limiting examples of angular parameters for use with the configuration of FIG. 5.

In some embodiments of the lenses used, its range of focus, and, in a case of a zoom lens, its focal length range, an angle of incidence of a light impinging on the interference filter 506 of FIG. 5 may be in excess of about 20 degrees. At angles above about 20 degrees, some MIF-S type filter's transmission bands may split into two separate peaks, such as is illustrated in FIG. 6A, chart 600A. This may occur because a P-component 602 (parallel to the plane of incidence) and an S-component 603 (perpendicular to the plane of incidence) are shifted by different amounts, as illustrated in the non-exhaustive, non-limiting example of FIG. 6A, FIG. 6B illustrates non-exhaustive non-limiting example 600B of angular parameters useable in conjunction with FIGS. 5 and 6A, including an angle of incidence 608 for interference filter 506 of FIG. 5 for incident light 614.

To avoid potential difficulties caused by this split, a polarizer, such as polarizer 504 of FIG. 5 may be placed behind the interference filter and in front of photo sensor 135 to allow virtually only P-polarized light to reach photo sensor 135, and to block the S-polarized light from reaching the photo sensor 135. In one embodiment, polarizer 506 and interference filter 506 may represent another configuration of AF component 180 of FIG. 1, and thus may be employed with system 100 of FIG. 1.

In this second configuration, a continuous range coloration present in the images projected onto to photo sensor 135 can be eliminated for final image capture, in one embodiment, by moving interference filter 506 and, if desired, polarizer 504, out of the digital camera's optical path before final image capture. However, as discussed above with respect to the first configuration, this may be optional in at least one embodiment.

In still one embodiment, configuration system 500 of FIG. 5 may result in a coloration issue for preview images. To display preview images with full color fidelity, a number of digital processing mechanisms may be employed. For example, in one embodiment, knowing a colorimetry of selected cardinal images, and an amount of color image offset at various scene distances, allows fast auto white balance techniques to be employed to remove or otherwise minimize unwanted color casts. In another embodiment, a final image could also be captured with the interference filter 506 in place, and subsequently corrected to remove undesirable color casts. An ability to leave interference filter 506 in place during both composing and final capture of an image, or series of images as might be the case for a video sequence, allows this second configuration system to continuously focus an object's image on the digital camera's photo sensor plane, from a beginning to an end of a picture taking process, from composition to capture.

Thus, the embodiments disclosed here are directed towards rapidly effecting auto focus operation without a use of added components that obstruct a digital camera's optical path during auto focus operation or require a use of special digital camera lenses for lens 113. In active systems, radiation, such as ultrasonic sound waves or infrared light, is sent towards the scene to be captures. The reflection of this radiation from objects in the scene is received by a separate sensor on the camera and analyzed using triangulation to determine object distance from the camera. However, such active systems require additional components to be added to the camera, thereby increasing costs. Further, unless a viewfinder is incorporated into the camera that is coupled to the field of views of the active autofocus' radiation source and separate radiation sensor, it may be difficult to know during auto focus operation an exact object or objects that the active auto focus system is focusing upon. This might then lead to inaccurate focus interest acted upon by the auto focus system. This is unlike that which is disclosed here where the image of the object on the photo sensor plan is used to effect auto focus operation, thus providing more accurate focus and better user control.

Moreover, unlike other systems, the first configuration of FIG. 2 employs two separate lenses, one an inverse of the other, mounted in the camera body, with a multiple color aperture filter located anywhere between the two lenses, and not necessarily at an aperture stop associated with the camera's image capturing lens. That is, the multiple color aperture filter is located anywhere between the two lenses independent of (or otherwise without respect to) an aperture stop associated with the camera's image capturing lens.

In addition, while the second configuration discloses a metal dielectric interference filter, other types of interference filters may also be used. For example, in one embodiment, a volume based holographic filter may be employed as the interference filter. In one embodiment, volume based holographic filters may operate to convert light incidence direction into spectral dependence, effectively making sure that the image that is constructed by the light passing through one side of the lens is separable from an image constructed using the other part of the lens. For example, a top half and a bottom half of the lens may operate to perform or otherwise create a "parallax" that allows determining the distance to objects in image, and thereby perform auto focusing.

In one embodiment, these interference filters, including the holographic filters, need not be angled with respect to the angle of an incident light, and in at least one embodiment, may be configured to be in a same plane as photo sensor 135 (e.g., both parallel with respect to each other).

Further, while the interference filters may be configured to be physically removed during capture of the image, as discussed herein, in one embodiment, the interference filter may be removed optically, by, for example, applying a current, voltage, or the like, across the interference filter to alter its optical properties, and thereby result in the interference filter to operate in a 'transparent mode,' (e.g., with respect to creating multiple images for an object not in focus).

Generalized Operation

The operation of certain aspects of the invention will now be described with respect to FIGS. 7-8. FIG. 7 illustrates one embodiment of a flowchart using disparities between multi-colored images to generate lens adjustment positions useable in performing fast autofocus from a single image. That is, as illustrated, and discussed further herein, auto focusing may be performed based on input from a single image, rather than mechanisms that perform actions based on a plurality of images. Further, process 700 of FIG. 7 may employ either configuration of FIG. 2 or FIG. 5 operating with system 100 of FIG. 1. Moreover, in one embodiment, process 700 may be performed at least in part within FAFP 143 of FIG. 1.

Process 700 of FIG. 7 begins, after a start block, at block 702 where a single image is first received. In one embodiment, the single image is received and potentially split into multiple color images that are displayed on a photo sensor plane, such as sensor 135 of FIG. 1. The splitting of the single image in multiple colored images when the single image is out of focus may be performed using either the first configuration of FIG. 2 or the second configuration of FIG. 5 as disclosed above.

Proceeding to block 704 a region of interest (ROI) is determined. In one embodiment, this ROI may be automatically determined based on any of variety of mechanisms, including based on selection of one or more objects within a scene for auto focusing. The selected objects may be a face, or the like. It should be noted that the ROI need not be within a central region of a scene in one embodiment; however, in other embodiments the ROI may be within the central region of the image. For example, as shown in FIG. 4, ROI 416 is illustrated as 'right' of the central image 404.

Continuing to block 706, for a selected image or images within the ROI, a current lens position is obtained. Such position indicates where the lens (lens 113 of FIG. 1) is currently located with respect to the photo sensor plane. Flowing next to block 708, when the selected image or images within the ROI are determined to be out of focus, as discussed above, there will be multiple color images of the same image displayed on the photo sensor plane. From the multiple color images, a disparity distance between the multiple color images is determined. In one embodiment, this disparity distance may be measured from a defined color image. For example, in one embodiment, a green image may be selected as a reference image. It is noted that the selection of the reference image need not be the green image, and any of the color images may be selected.

In any event, selection of a reference image enables the determination of which direction, away from or towards, to move the camera lens with respect to the photo sensor plane. For example, in FIG. 4, image 411 represents a green color image of the single image, and image 410 represents a magenta color image of the same single image. Because the green image (image 411) in FIG. 4 is to the right of the magenta color image (image 410), in one embodiment, it can be determined that the camera lens is to be moved backwards, or otherwise closer to photo sensor to enable the two images to be coincident and therefore in focus. Similarly, to continue this non-exhaustive example, should it be desired instead to bring the single image represented by the multiple color images 406-407 into focus, the camera lens would be moved forwards, or away from the photo sensor, as the green image 406 is to the left of the magenta image 407. Again, it is noted, that these are selected conventions of directions, and others conventions may be chosen without departing from the scope of the disclosures herein. For example, a different colored image may be selected as the reference image, or even a different forward or backwards positioning may be selected.

In any event, the disparity distance between the images may be determined as a magnitude of a distance between the images. This disparity distance may be determined, in one embodiment as a number of pixels between a same point on the multiple colored images. However, in another embodiment, the disparity distances may be determined using any of a variety of other units.

Processing then proceeds to block 710, wherein in one embodiment, a location on the lens may also be determined for where the ROI is located. In at least one embodiment, this additional determined may be used as a correction factor for curvature characteristics or other anomalies of a camera lens. For example, images located within a central region of the camera lens might have a different focusing characteristic than regions located closer to a viewing edge of the camera lens. Referring again to FIG. 4, images 406-407 are seen as nearer to one edge of the viewing region of the lens than, say image 404. Thus, a different lens correction factor might be used to further automatically focus the lens position. As shown in FIG. 4, one embodiment of a viewing region for the camera's focusing lens 113 may be represented by region 420.

Continuing to block 712, the disparity distance may be converted using a table, formula, lookup table (LUT), or any of a variety of mechanisms, into an index value. The index value may then be used as an input into a disparity correction module, described in more detail below, to obtain a lens adjustment position. In one embodiment, the above discussed direction may also be used as an input into the disparity correction module. However, in another embodiment, the direction may be used as a plus/minus multiplier to be combined to the output of the disparity correction module.

In one embodiment, the lens correction factor may further be employed as an input to the disparity correction module. For example, in one embodiment, a determination of the region of the lens for focusing, may be used to select which LUT, equation, or the like, to use to determine the lens adjustment position output. However, in another embodiment, the lens correction factor may be a multiplier that may be combined with the output of the disparity correction module to determine the direction and magnitude of the lens adjustment position.

Further, in one embodiment, at block 712, the lens adjustment position may be determined as a distance based on a current lens position in which to move the lens, thereby negating a need to employ a current lens position as determined at block 706. However, in another embodiment, the lens adjustment position may be combined with the current lens position of block 706 and used to reposition the lens position. In any event, the lens adjustment position may be provided as a control signal to motive element 134 to automatically relocate optical lens component 113 to refocus the selected image with the ROI.

As noted, this approach is applied to a single image frame. Therefore, the in-focus lens position for each image plane, from infinity to a closest distance the lens can focus, is obtained from the capture of a single image. For this reason, continuous focus adjustments can be effected at the frame rate at which images are acquired. No comparison between acquired preview images is employed, thus allowing the process to be performed at a preview image frame rate. Thus, as shown in FIG. 7, a determination may be made at decision block 714, to determine whether the image is to be captured. For example, a detection of final image capture may be based on a depression of a switch by the user. In any event, should the image be determined not to be captured as a final image, process 700 may loop back to block 702 to continue auto focusing for each received image, until at least an image is selected for final capture. In that case, processing flows to optional block 716.

When the ROI of the scene to be captured is not in focus on the camera's photo sensor, the 'preview' image will show discoloration and/or color fringing around objects in the ROI, as well as other not in focus scene objects, due to the multiple color aperture filter mounted in the camera as discussed above. The preview image may be discolored when the ROI of the scene to be captured is in focus as well, however. This may be because objects that are located at the in focus distance plane may have their color components, magenta and green for example, in coincidence, but the other objects in the scene may display offset magenta and green image components. See FIG. 4 above for an example illustration of this affect. Further, the lenses mounted in front of and behind the multiple color aperture filter of the first configuration, for example, may not be completely symmetrical around their optical axes, thus disallowing 100% coincidence of color image components in all areas of the ROI.

Thus, at optional block 716, for final capture, additional optional image coloration corrections may be performed. In one embodiment, the image coloration might be eliminated by moving the multiple color aperture filter and its associated lenses (or interference filter and/or polarizer) out of the digital camera's optical path before final image capture. Processing may then end.

However, in one embodiment, the above process may still leave coloration issues for preview images. To display preview images with full color fidelity, a number of digital processing mechanisms may be used. For example, knowing a light filtration characteristic of the color filters, or interference filter, an amount of color image offset at all scene distances, and the like, would then allow use of a fast auto white balance technique or similar approaches to be performed to remove unwanted color casts. In still another embodiment, the final image might also be captured with the multiple color aperture filter in place and subsequently correcting to remove undesirable color casts at optional block 716. An ability to leave the multiple color aperture filters in place during both the composing and the final capture of an image, or series of images, thereby enables continuously focusing an object's image on the photo sensor's plane, from a beginning to an end of the picture taking process, from composition to capture.

Figure 8:
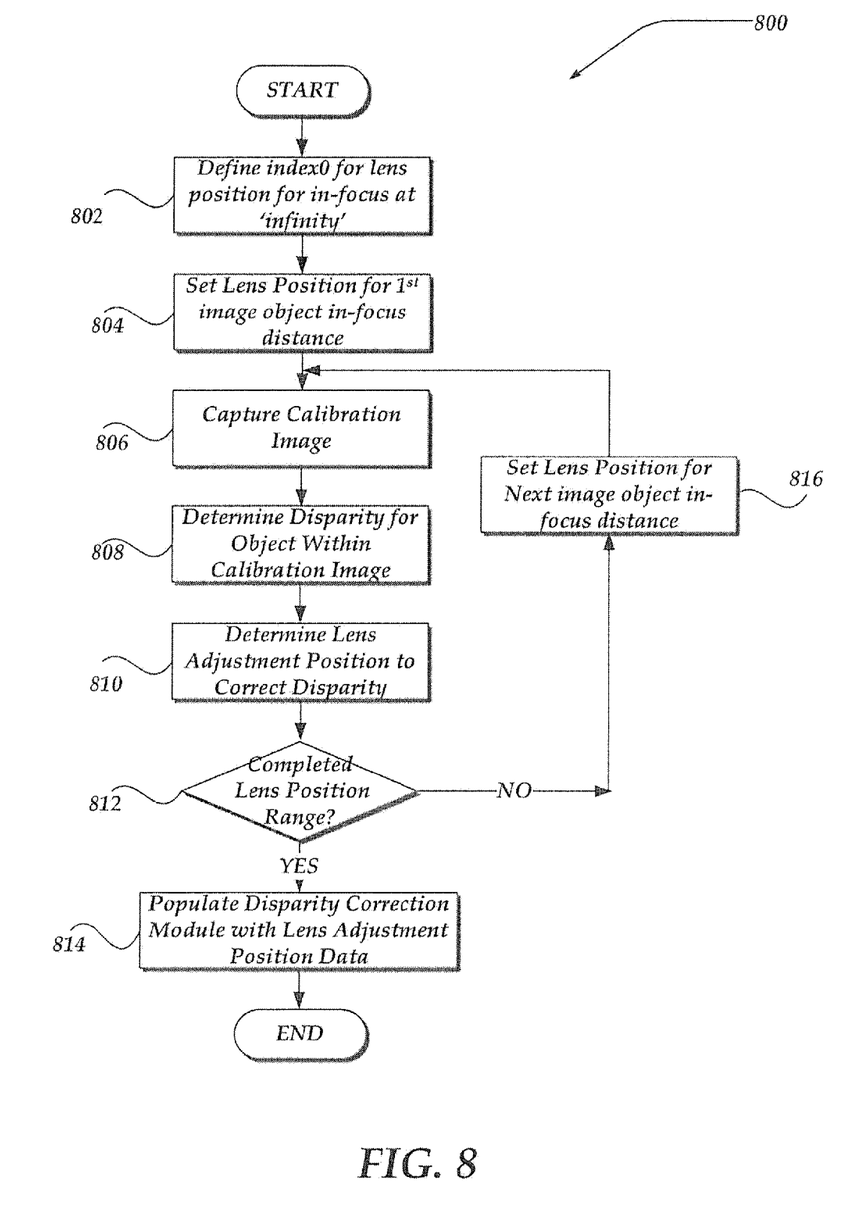
FIG. 8 illustrates one embodiment of a flowchart useable to populate a calibration module with lens adjustment position data for use in the flowchart of FIG. 7.

FIG. 8 illustrates one embodiment of a flowchart useable to populate a calibration module with lens adjustment position data for use in process 700 of FIG. 7. As discussed above, a disparity correction module may be implemented using any of a variety of mechanisms, including a LUT, an equation, or the like, any of which may be implemented using software, or a circuit, or a combination of software and circuits. Further, described below in one possible ways for obtaining calibration data for use in providing a lens adjustment position, and other ways are also envisaged. Thus, the embodiments disclosed herein are not limited by the following non-exhaustive example below. In one embodiment, a Lookup Table (LUT) may be populated with data by use of a manufacturing calibration process that equates every camera lens position with a metric (index) responsive to a multiple colored image coincidence. For purpose of illustration, the multiple colored images may be magenta and green. However, other colors may also be selected. In any event, the output of the LUT is at least a lens adjustment position to be used to reset the camera lens with respect to, for example, the photo sensor plane, to cause an object at a given distance in front of the lens to be in focus on the photo sensor plane.

As illustrated, process 800 of FIG. 8 begins, after a start block, at block 802, wherein an object at the 'infinity' plane in front of the camera's lens, a distance usually greater than 30 feet, is represented as 'index 0'. This index equates to the distance the lens must be placed from the photo sensor plane to cause objects on the infinity plane of the lens to be in focus on the sensor plane. It may be used as a starting position for the multiple color matching process.

Thus, flowing next to block 804, the lens position may be set to a distance from the sensor plane that an object at a first distance is in focus on the sensor plane. Although this distance may be virtually any value, in one embodiment, for example, this distance may be set to 20 feet. Thus, in this example, a distance of 20 feet in front of the lens may be represented by 'index 1.' That is, this index may equate to a magenta/green colored image matching process position at which the green and magenta image components of objects of the first image, that reside on the 20 foot distance image plane in front of the camera's lens, are coincident on the photo sensor plane, and thus in focus on the senor plane.

Processing then flows to block 806, where a calibration image is then captured at this lens position. Flowing next to block 808, using the green image component of this captured image as reference, the magenta component of the image may be moved with respect to the green image component in a predetermined direction, until the multiple colored images are coincident. Any of a variety of correlation and/or sum of absolute differences may be used to determine when coincidence is reached. Processing then block to block 810, where the distance that the lens is moved to achieve coincidence is determined and used as a lens adjustment position to correct disparity for this image distance.

Process 800 then flows to decision block 81'2, where a determination is made whether the range of the lens position has been analyzed. If so, processing flows to block 814; otherwise, the processing loops to block 816.

At block 816, another lens position for a next image object in focus distance is used. Thus, for each lens position from the photo sensor plane that causes objects between 20 feet and, for example, 1 foot in front of the camera, to be in focus on the sensor plane is selected, to generate indices that equate to multiple color image components coincidence for objects at distance planes between 20 feet and 1 foot in front of the camera's lens. For each distance, the index value is also increased by a consistent corresponding value. In one embodiment, such increased by be by a single unitary value. However, other values may also be used.

Note that other distance ranges may also be selected, and thus, these values are illustrative and do not constrain the disclosed embodiments. In any event, processing continues to loop back to blocks 806, 808, 810, and decision block 812, until the lens' range is analyzed.

At block 814, the disparity correction module is then populated with the lens adjustment position data obtained above from the photo sensor for the noted incremental indices. In one embodiment, the disparity correction module may employ a LUT as discussed above. However, in other embodiment, other mechanisms may also be employed.

Moreover, while the above discloses obtaining a single lens adjustment position for each index, other embodiments may also obtain correction factors based on anomalies of the camera lens. Thus, in one embodiment, correction factors might be obtained for objects based on where within a viewing region of the lens the object is located. For example, when an object is determined to be near an edge of the viewing region of the lens, one correction factor might be obtained, while a different correction factor might be obtained for object evaluations where the object is closed to a center region of the viewing region of the lens. In still another embodiment, a lens adjustment position might be determined based on the region within the lens the object resides, rather than merely determining an additional correction factor. Thus, embodiments may instead determine as input into the disparity correction module, a disparity distance, a displacement direction with respect to a reference image, but also a region location within the lens' viewing region.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A processor based method, comprising:
  receiving for a single frame image, multiple color images of the single frame image onto a photo sensor plane, the multiple color images indicating that an object within the single frame image is out of focus on the photo sensor plane, wherein the multiple color images are created using an interference filter placed in front of the photo sensor and arranged at an angle with respect to the photo sensor plane to cause a color image of the object projected onto the photo sensor to be displaced with respect to an other color image of the object as a function of a distance the focusing lens is from the object, each color image and the other color image having a continuous range of colors being projected onto the photo sensor at the same time;
  selecting from the multiple color images a reference color image;
  determining with respect to the reference color image a disparity distance between the reference color image and the other color image in the multiple color images;
  determining a directional relationship between the reference color image and the other color image;
  determining a lens adjustment position in which to move a focusing lens with respect to the photo sensor plane using as input at least the directional relationship and the disparity distance; and
  for the single frame image automatically relocating the focusing lens using the lens adjustment position such that the multiple color images are coincident on the photo sensor plane for the object indicating that the object is in focus.

2. The method of claim 1, wherein a polarizer is further situated between the interference filter and the photo sensor to block S-polarized light from reaching the photo sensor.

3. The method of claim 1, wherein determining the lens adjustment position further comprising, determining the lens adjustment position based on a defined region of interest within a viewing region of the focusing lens.

4. The method of claim 1, wherein the interference filter comprises at least one of a metal dielectric interference filter configured to use light interference to pass or block selected wavelength regions, or a volume holographic filter.

5. An image system, comprising:
  a photo sensor device useable to receive a image; and
  one or more components that perform actions, including:
    receiving for a single frame image having an object therein, multiple color images of the single frame image on a plane of the photo sensor, the multiple color images indicating that the object is out of focus on the photo sensor plane, wherein the multiple color images are created using an interference filter placed in front of the photo sensor and arranged at an angle with respect to the photo sensor plane to cause a color image of the object projected onto the photo sensor to be displaced with respect to an other color image of the object as a function of a distance the focusing lens is from the object, each color image and the other color image having a continuous range of colors being projected onto the photo sensor at the same time;
    selecting from the multiple color images a reference color image;
    determining with respect to the reference color image a disparity distance between the reference color image and the other color image in the multiple color images;
    determining a directional relationship between the reference color image and the other color image;
    determining a lens adjustment position in which to move a focusing lens with respect to the photo sensor plane using as input at least the directional relationship and the disparity distance; and
    for the single frame image relocating the lens using the focusing lens adjustment position such that the multiple color images are coincident on the photo sensor plane such that the object is automatically focused using the single frame image.

6. The image system of claim 5, wherein a polarizer is further situated between the interference filter and the photo sensor to block S-polarized light from reaching the photo sensor.

7. The image system of claim 5, wherein the interference filter comprises at least one of a metal dielectric interference filter configured to use light interference to pass or block selected wavelength regions, or a volume holographic filter.

8. An apparatus for encoding image data, comprising:
  a focusing lens that is arranged to provide at least a single frame image;
  an auto focusing component that is configured to receive the single frame image and to create multiple color images onto a plane of a photo sensor, the multiple color images indicating that an object in the single frame image is out of focus on the photo sensor plane, wherein the auto focusing component comprises an interference filter placed in front of the photo sensor and arranged to cause a color image of an object projected on the photo sensor to be displaced with respect to an other color image of the object as a function of a distance the focusing lens is from the object, each color image and the other color image having a continuous range of colors being projected onto the photo sensor at the same time; and one or more components that perform actions, including:
selecting from the multiple color images a reference color image;
determining with respect to the reference color image a disparity distance between the reference color image and the other color image in the multiple color images;
determining a directional relationship between the reference color image and the other color image;
determining a lens adjustment position in which to move the focusing lens with respect to the photo sensor plane using as input at least the directional relationship and the disparity distance; and
for the single frame image relocating the focusing lens using the focusing lens adjustment position such that the multiple color images are coincident on the photo sensor plane such that the image is automatically focused for the object using the single frame image.

9. The apparatus of claim 8, wherein a polarizer is further situated between the interference filter and the photo sensor to block S-polarized light from reaching the photo sensor.

10. The apparatus of claim 8, wherein the interference filter comprises one of a metal dielectric interference filter configured to use light interferences to pass or block selected wavelength regions or a volume based holographic filter.

* * * * *

UNITED STATES PATENT AND TRADEMARK OFFICE
CERTIFICATE OF CORRECTION

PATENT NO. : 8,619,182 B2  
APPLICATION NO. : 13/413584  
DATED : December 31, 2013  
INVENTOR(S) : Fainstain Page 1 of 1

It is certified that error appears in the above-identified patent and that said Letters Patent is hereby corrected as shown below:

In the Drawings

Fig. 5, Drawing Sheet 5 of 8, delete "  " and insert -- -- , therefor.

Fig. 8, Drawing Sheet 8 of 8, for Tag "802", in Line 1, delete "index0" and insert -- index 0 --, therefor.

In the Specification

Column 1, Line 10, delete "altos" and insert -- a lens --, therefor.

Column 4, Line 19, delete "sensor" and insert -- sensor. --, therefor.

Column 7, Line 39, delete "other lens" and insert -- other lens. --, therefor.

Column 10, Line 4, delete "polarizer 506" and insert -- polarizer 504 --, therefor.

Column 14, Line 55, delete "decision block 81'2," and insert -- decision block 812, --, therefor.

Column 14, Line 57, delete "block 814;" and insert -- block 814, --, therefor.

Signed and Sealed this  
Tenth Day of June, 2014

Michelle K. Lee  
*Deputy Director of the United States Patent and Trademark Office*